No. 872,422.

PATENTED DEC. 3, 1907.

F. G. HODELL.
BUTTER CUTTING MACHINE.
APPLICATION FILED MAY 22, 1907.

3 SHEETS—SHEET 1.

WITNESSES:
E. M. Fisher
L. F. Kimball

INVENTOR.
Frederic G. Hodell
BY
Fisher & Moert
ATTORNEYS

No. 872,422. PATENTED DEC. 3, 1907.
F. G. HODELL.
BUTTER CUTTING MACHINE.
APPLICATION FILED MAY 22, 1907.
3 SHEETS—SHEET 2.
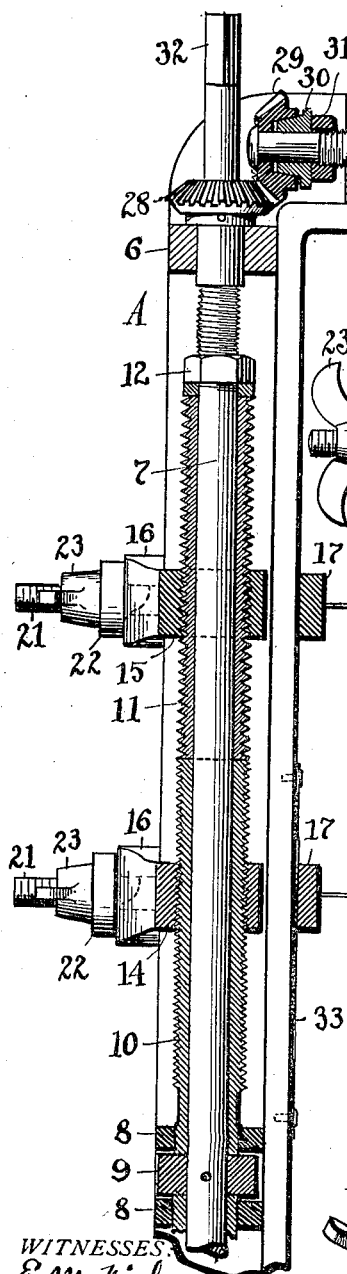
Fig. 3.
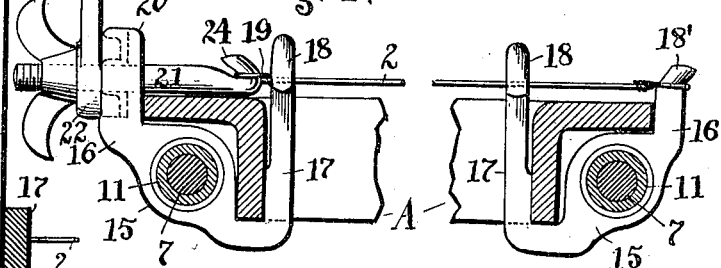
Fig. 4.
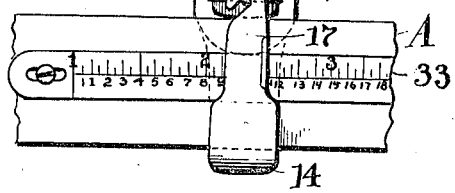
Fig. 5.
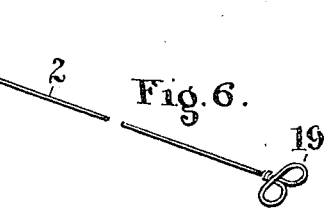
Fig. 6.
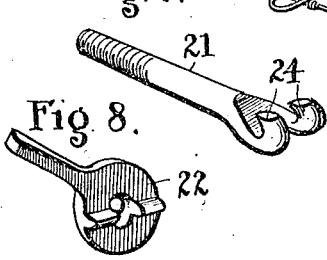
Fig. 7.
Fig. 8.
WITNESSES:
E. M. Fisher
L. F. Kimball
INVENTOR.
Frederic G. Hodell
BY
Fisher & Most
ATTORNEYS.

No. 872,422. PATENTED DEC. 3, 1907.
F. G. HODELL.
BUTTER CUTTING MACHINE.
APPLICATION FILED MAY 22, 1907.

3 SHEETS—SHEET 3.

WITNESSES:
E. M. Fisher
L. F. Kimball

INVENTOR.
Frederic G. Hodell
BY
Fisher & Moser
ATTORNEYS.

UNITED STATES PATENT OFFICE.

FREDERIC G. HODELL, OF CLEVELAND, OHIO.

BUTTER-CUTTING MACHINE.

No. 872,422.  Specification of Letters Patent.  Patented Dec. 3, 1907.

Application filed May 22, 1907. Serial No. 375,026.

*To all whom it may concern:*

Be it known that I, FREDERIC G. HODELL, a citizen of the United States, residing at Cleveland, in the county of Cuyahoga and State of Ohio, have invented certain new and useful Improvements in Butter-Cutting Machines, and do declare that the following is a full, clear, and exact description of the invention, which will enable others skilled in the art to which it appertains to make and use the same.

My invention relates to butter cutting machines, and the invention consists more especially in the adjustable cutting means employed in such machines, all substantially as hereinafter described and more particularly pointed out in the claims.

Butter cutting machines of the class to which my invention applies, employ movable frames having cutting wires to cut a firkin or tub of butter into a definite number of rectangular prints or blocks, the size and weight thereof being predetermined by preliminary adjustment of the wires. Heretofore, such adjustment was accomplished by individual setting of each wire, and both care and skill was required to space the different wires equal distances apart, otherwise the slightest variation would produce a corresponding variation in the weight of the prints or blocks. Furthermore, exact knowledge was required by the operator in setting the wires for different prints or blocks, and accurate adjustment was difficult and a slow proceeding.

My principal object is embodied in the means for adjustably setting all the cutting wires simultaneously and proportionately one to the other, and with great accuracy and without delay or special knowledge or skill on the part of the operator.

Other objects are embodied in the means for individual adjustment of the wires irrespective of the universal adjustment for all the wires, and in the means for tightening and loosening the wires and for removably mounting them in place on the adjusting means, and in other details as hereinafter more specifically described.

Figure 1:
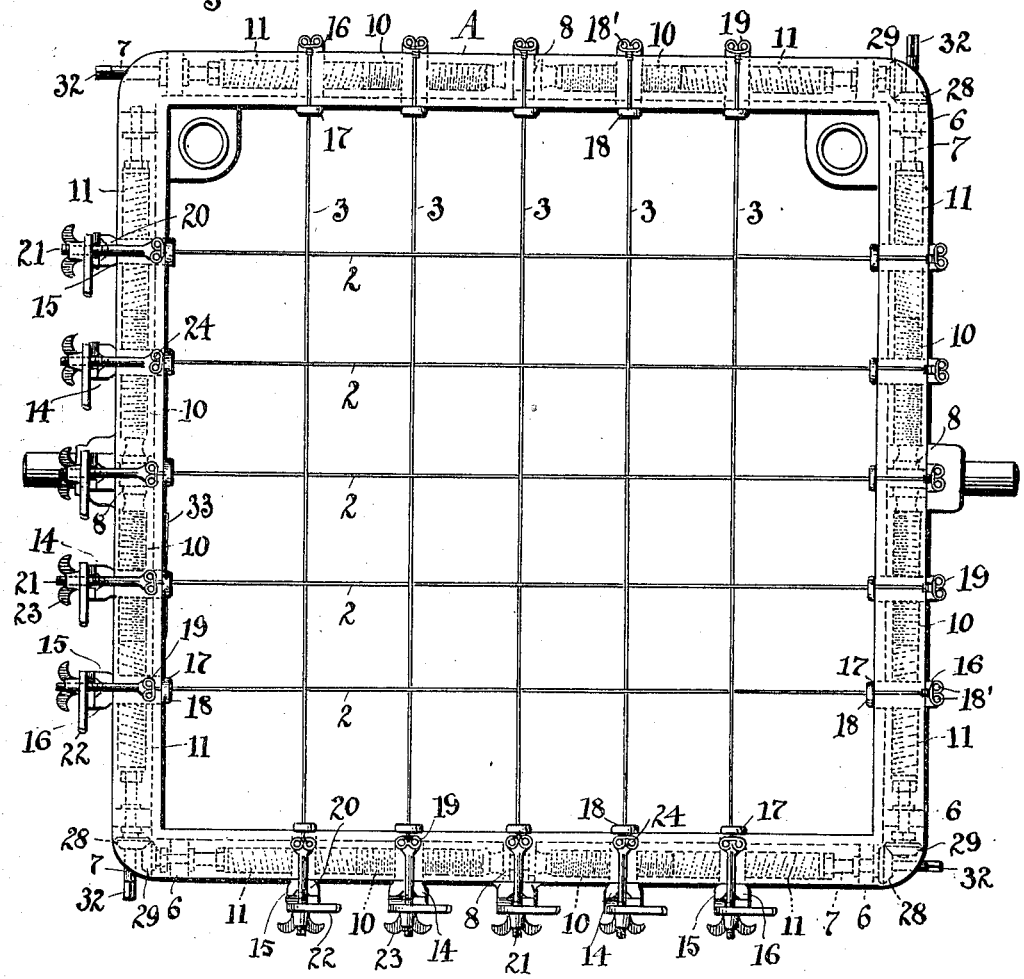
Figure 2:
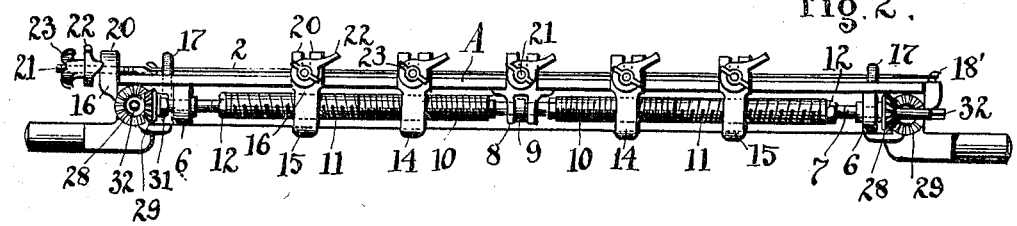
Figure 9:
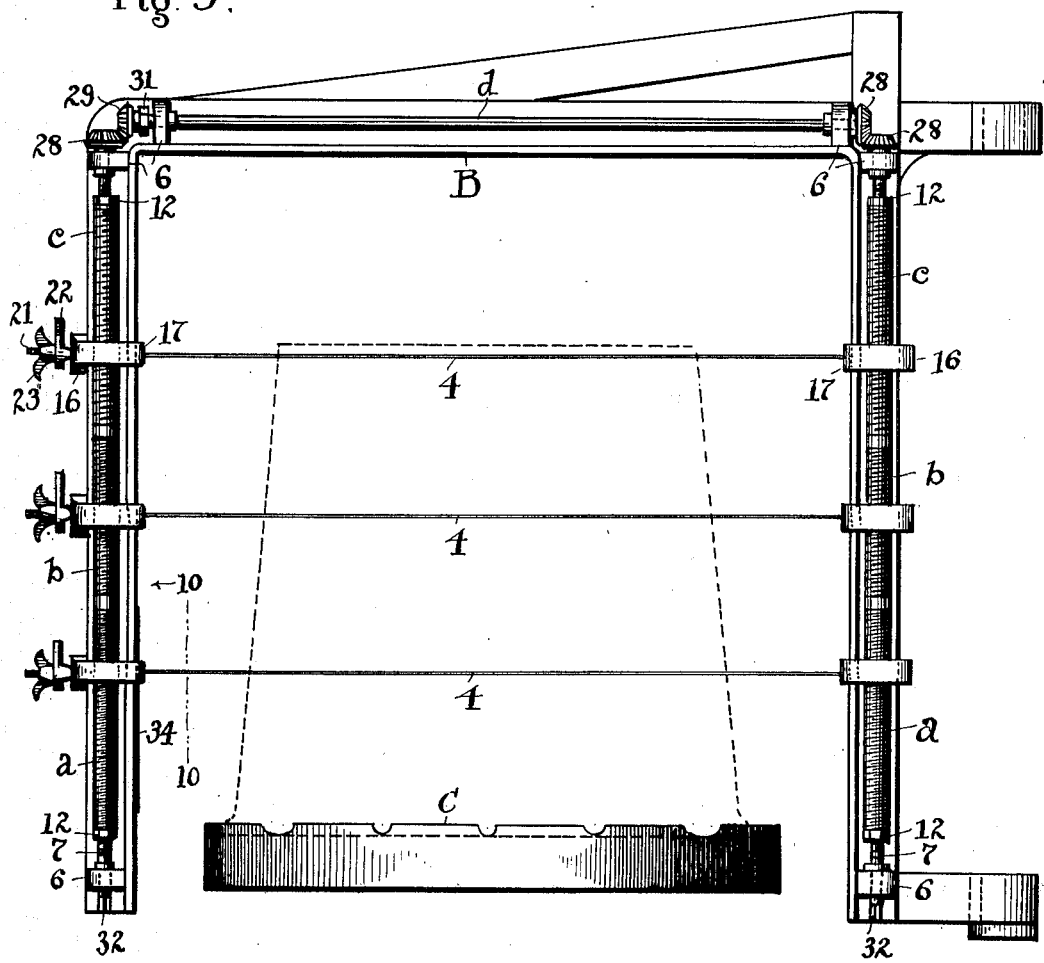
Figure 10:
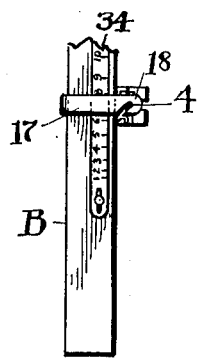
Figure 11:
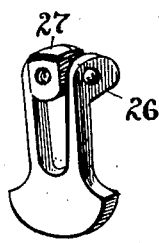

In the accompanying drawings, Figure 1 is a plan view or face elevation of one form of cutting frame carrying cross wires and my improved adjusting mechanism therefor, and Fig. 2 is an edge elevation of the foregoing.
Fig. 3 is an enlarged elevation and sectional view of a corner portion and one side of the cutting frame and adjusting parts shown in Fig. 1; but viewed from the opposite or bottom side thereof. Fig. 4 is a cross section of the cutting frame broken away at its center and brought together, with edge views of a cutting wire and its carrying members and screws. Fig. 5 is a view of a part of the frame and a cutting wire carrying member, and showing more particularly the scale or gage behind said member. Fig. 6 is a perspective view of the ends of a cutting wire, and Fig. 7 is a similar view of the screw hook for said wire. Fig. 8 is a perspective view of the cam plate used with the screw stem in tightening the wires. Fig. 9 is a side view of a horizontally swinging frame carrying my improved adjusting means for the cutting wires, and which frame is also used in the same butter cutting machine employing the cutting frame shown in Fig. 1. Fig. 10 is a detail view on line 10—10 Fig. 9 showing the graduated scale on the frame in said figure. Fig. 11 is a perspective view of a modified form of tightening screw member for the wires.

The cutting frames usually employed in butter cutting machines are two in number, and comprise first, a vertically movable frame A, and second, a horizontally swinging or laterally movable frame B. Frame A is open and substantially square in outline and is provided with cutting wires 2 stretched from side to side in parallel lines and other cross wires 3 at right angles thereto. Frame B is three sided and has a series of parallel wires 4 stretched at different elevations between its two vertical sides. Both frames A and B and the wires thereon are used to cut the butter into prints of a definite width, breadth and length to make blocks of equal weight, usually one pound each. Butter varies somewhat in density and again, butter dealers have different standards in sizes although the weight of the prints remain the same, say one pound, and to meet these different conditions the cutting wires are adjustably mounted on said frames. My invention contemplates the use of all the foregoing and I also provide each cutting frame with mechanism adapted to give a universal adjustment to all the wires thereon and construct the same as follows:

Frame A is preferably angular in cross section with one flat face uppermost and has bearing pieces 6 upon its bottom at each corner which support four separate but similar shafts 7 longitudinally of the sides of the frame and in the angle thereof. A split bearing part 8 is also provided for each shaft 7 centrally between its ends and midway of the sides of the frame, and a collar 9 on each shaft occupies said split bearing and holds the shaft against end movement in either direction. A double set of tubular sleeves 10 and 11 are rotatably mounted upon each shaft 7, two at each side of central bearing part 8, and all said sleeves are locked upon said shaft to rotate jointly therewith by nuts 12 threaded on the shafts and bearing against the outer ends of the two outer sleeves 11 and which thrust said sleeves against the inner sleeves and the inner end of sleeves 10 against collar 9. By loosening nuts 12, any one sleeve may be independently rotated to obtain an individual adjustment of the cutting wires in respect to an adjoining wire and which is done but once as a rule and thereafter remains unchanged.

Inner sleeves 10 are externally threaded and are rights and lefts to each other, as are outer sleeves 11, but the threads of inner sleeves 10 are of the same pitch although not the same pitch as the threads on the outer sleeves 11 which have a coarser or quicker thread, say two to one. The object of this arrangement is to maintain equal distances between parallel wires during universal adjustments, and to that end wire mountings or supports 14 and 15 having threaded engagement with sleeves 10 and 11 respectively, are used in connection therewith. All said mountings are substantially alike, except for the difference in threads and more especially in that the pairs of mountings for each wire at opposite sides of frame A are slightly modified to permit the use of supplementary wire tightening and fastening means for one mounting of each set. Thus, referring to Fig. 4, each mounting has similar vertical projections 16 and 17 overlapping the outer and inner edges, respectively of frame A, and the inner projections 17 have hook ends 18 which hold the cutting wires in fixed alinement and against pressure during cutting operations. But outer portion 16 of the mounting at the right of Fig. 4, has a pair of inclined studs 18' at its top to detachably secure double loop or eye 19 of wire 2, and outer projection 16 of the mounting at the left of said figure has a slotted upper end 20 within which screw stem 21 is removably seated and which also serves as a cam head for a rotatable cam lever 22 located at its outer face and which cam lever has a central opening for screw stem 21 to pass freely therethrough and to project at one side thereof for engagement by thumb nut 23. Screw stem 21 has a forked or double hook end 24 adapted to secure double loops or eyes 19 thereon, each of the cutting wires being provided with similar double loops or eyes at both ends, whereby the axial pull or strain upon the wire is central and equally distributed between two points of attachment at either end of the wire, thereby making a strong and durable fastening especially adapted for heavy work. Thumbnut 23 is used to take up the slack in the wire and cam lever 22 is employed to relieve the tension thereon when adjustment of the wires takes place, said cam levers providing for quick relief without disturbing the fixed thumbnut adjustment. Other means, such as an eccentric lever 26 pivoted to a screw nut 27 for screw stem 21 may be substituted for the cam lever and thumbnut shown and described, see Fig. 11.

The operating shafts 7 are geared together for joint operation and are also constructed to be operated singly if desired. To this end, two of the four shafts have bevel gears 28 and 29 at opposite ends, and the other two, one gear each. Gear 28 is permanently keyed or pinned to the shaft and gear 29 sleeved or free thereon but adapted to be frictionally engaged by a cone slidably keyed to the shaft and socketed in the back of said gear 29. Nut 31 is threaded upon the shaft behind said cone and serves to lock both cone and gear 29 together when power is to be transmitted from one shaft to another. It will be understood that gears 28 and 29 are in mesh at three corners of frame A and that rotation may be imparted universally to all four shafts on the four sides of the frame by rotating either one of said shafts at their angular ends 32 and by a crank or key (not shown). Such universal rotation occurs when all the gears 29 are locked upon their respective shafts and when simultaneous adjustment of wires 2 and 3 is desired.

Adjustment of the cutting wires at any one side of the frame is obtained by unlocking one or more of the gears 29, so that the shaft at that side may be independently rotated. Thus, various cross sectional shapes of the prints or blocks may be cut as predetermined by independent adjustment of the wires.

The central divisional wires between the sides of frame A are fixed, or in other words, their supports 8 do not travel but are attached to the frame, and the other wires which lie parallel with said divisional wires move in or out in respect thereto. Thus, when simultaneous movement of all the wires is brought about, the wires immediately next to the divisional wires have a relatively slower feed than the extreme outer wires and in such proportionate degree that all the parallel wires maintain relatively equal distances throughout such movement. The same result is obtained with substantially similar adjusting means for wires 4 on frame B, only here the idea is carried a step further and all the wires, three in number, are movable in a gradually increasing ratio using base plate C as the fixed line to or from which they travel. This result is obtained by three sets of screw sleeves *a*, *b* and *c* having different pitch threads, the ratio being 24, 12 and 8. A cross shaft *b* at the top of the frame and bevel gearing 28 and 29 thereon as in frame B provide for joint operation of vertical shafts 7 and the screw sleeves mounted thereon.

Frame A is provided with a gage plate 33, see Fig. 5, which has the inches and fractional parts thereof marked thereon and said fractional parts are further consecutively numbered from 1 up. Frame B also has a gage plate 34 with graduations marked thereon but said graduations are spaced apart in an increasing ratio from the bottom upward and marked from 1 upward to correspond with the numbers representing the fractional parts on gage plate 33 of frame A. These two gage plates serve as a guide to set the wires on their respective frames to cut different shapes of prints without changing the cubic area of the print. Thus, let us say that the standard print containing one pound of butter of a certain density measures 2 9-16 inches square by 4 5-16 inches long. The first step would be to set the wires on frame A at 2 9-16 inches using gage 33, and then observe the number representing that fractional part on the gage which we will say is numeral 11 in this instance. The corresponding numeral 11 on gage 34 would therefore, be the mark to set wires 4 of frame B to get the proper length of the print, that is, 4 5-16 inches. As the cross sectional area of the print is lessened, greater length is required if the same cubic area is to be retained, and therefore a sliding scale or gage 34 is required on frame B to combine with a scale or gage 33 of frame A.

What I claim is:—

1. In butter cutting machines, a frame having adjustable cutting wires and means to stretch said wires under tension upon said frame, and supplementary slack producing means for said wires usable during periods of adjustment.

2. In butter cutting machines, a frame and a series of parallel wires mounted thereon having screw and cam tension members for said wires.

3. In butter cutting machines, a frame and cutting wires and adjustable operating means for setting said wires, and quick relief or slack producing means for said wires adapted to permit adjustment of the said setting means.

4. In butter cutting machines, a frame having cutting wires adjustably supported thereon, and a gage plate having sliding scale graduations thereon for use in setting said wires to cut different length prints.

5. In butter cutting machines, the combination of a vertically movable frame having cross cutting wires, with a laterally movable frame having parallel cutting wires at different elevations, a gage plate on said vertically movable frame having graduations consecutively characterized, and a gage plate on said laterally movable frame having sliding scale graduations provided with characters corresponding to said other gage plate.

6. In butter cutting machines, a frame and a shaft mounted thereon at each side, gears connecting said shafts and friction mechanism fastening said gears, and mountings for cutting wires adjustably supported on said shafts.

7. In butter cutting machines, a cutting frame and four several shafts mounted thereon and geared together at their ends for joint operation, wire supports adjustably engaged upon said shafts and extending upon opposite sides of said frame and provided on one side thereof with overhanging hooks adapted to engage over the cutting wires, and tension devices for the wires in said supports.

8. In butter cutting machines, a frame and screw shaft on the sides thereof having gear connection at their ends, two series of cutting wires at right angles to each other and means adjustably mounting said wires on said shafts.

9. In butter cutting machines, a supporting frame, shafts mounted in the sides of said frame having gear connections at their ends, a pair of separately rotatable sleeves fixed on each shaft, wire supports mounted on said sleeves, and tension devices for the wires on said mountings having double hooks, and said wires having double loops engaged on said hooks.

10. In butter cutting machines, a rigid frame, shafts on the sides of said frame having gear connections in the angles thereof, a set of separate externally threaded sleeves fixed on each shaft, wire supporting mountings on said sleeves and wire tension devices on said mountings.

11. In butter cutting machines, a rectangular supporting frame, a rotatable shaft on each of the four sides of said frame and a set of differentially threaded sleeves on each shaft, wire supports mounted on said sleeves and extending across opposite sides of said frame and cutting wires mounted on said supports.

12. In butter cutting machines, a rigid supporting frame having parallel sides, a screw shaft at each side rotatably mounted in said frame, a pair of differentially threaded sleeves on each shaft, wire supports operatively engaged with the said sleeves, and cutting wires connected with oppositely disposed supports.

13. In butter cutting machines, a rigid frame, cutting wires thereon and fastening means for said wires comprising adjustable mountings therefor having double hooks for each end of the wire and said wires having double loops at each end.

14. In butter cutting machines, a rigid frame, cutting wires adjustably and detachably mounted thereon, and tension means for said wires comprising a screw stem at one end of said wires having a double hook and double loops on said wires engaged with said hook, and means to tighten said stem.

In testimony whereof I sign this specification in the presence of two witnesses.

FREDERIC G. HODELL.

Witnesses:
  R. B. MOSER,
  F. C. MUSSUN.